Oct. 18, 1966  R. NEUSCHOTZ  3,279,053
METHOD OF INSTALLING THREADED ELEMENT
Filed Nov. 26, 1963  2 Sheets-Sheet 1
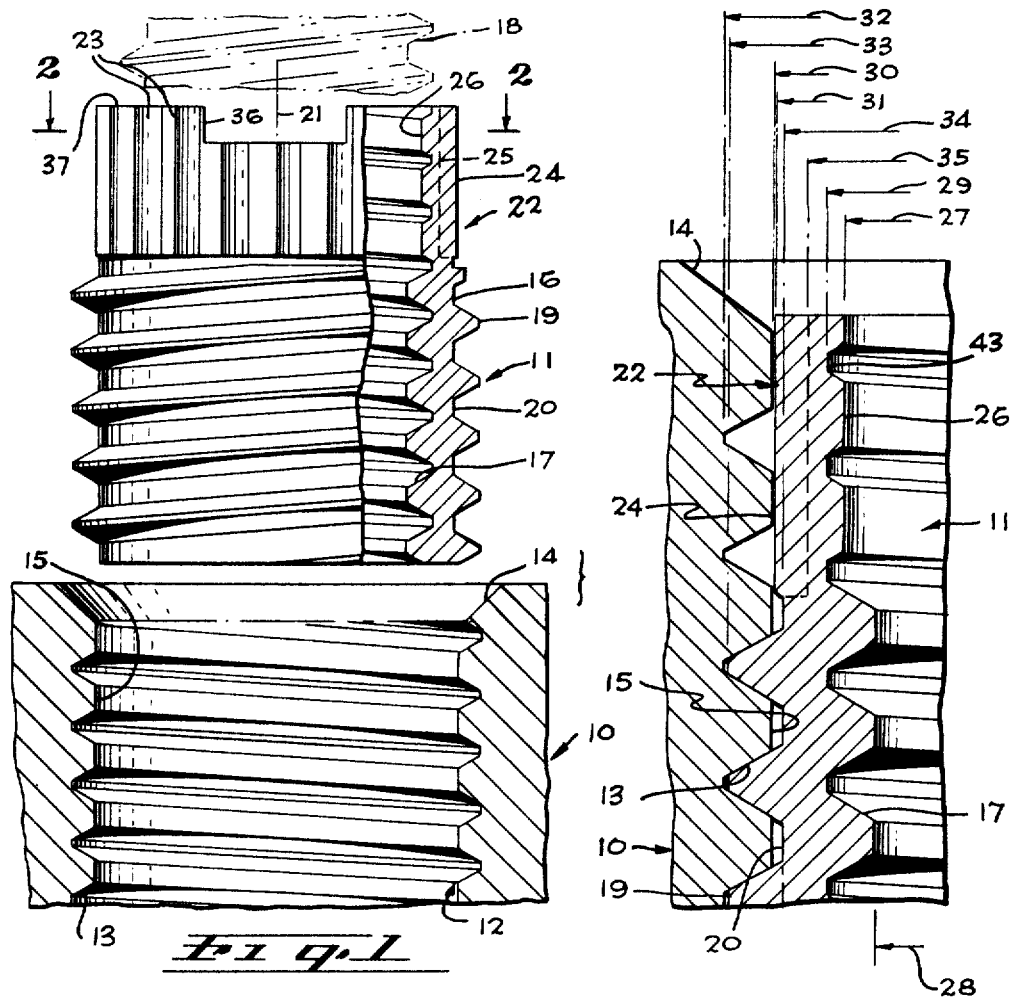
Fig. 1
Fig. 3
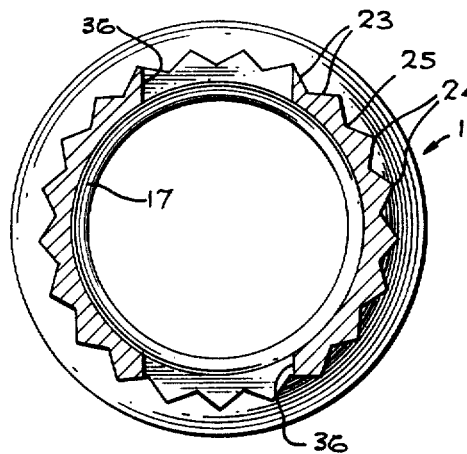
Fig. 2
ROBERT NEUSCHOTZ
INVENTOR.
BY William P. Green
ATTORNEY

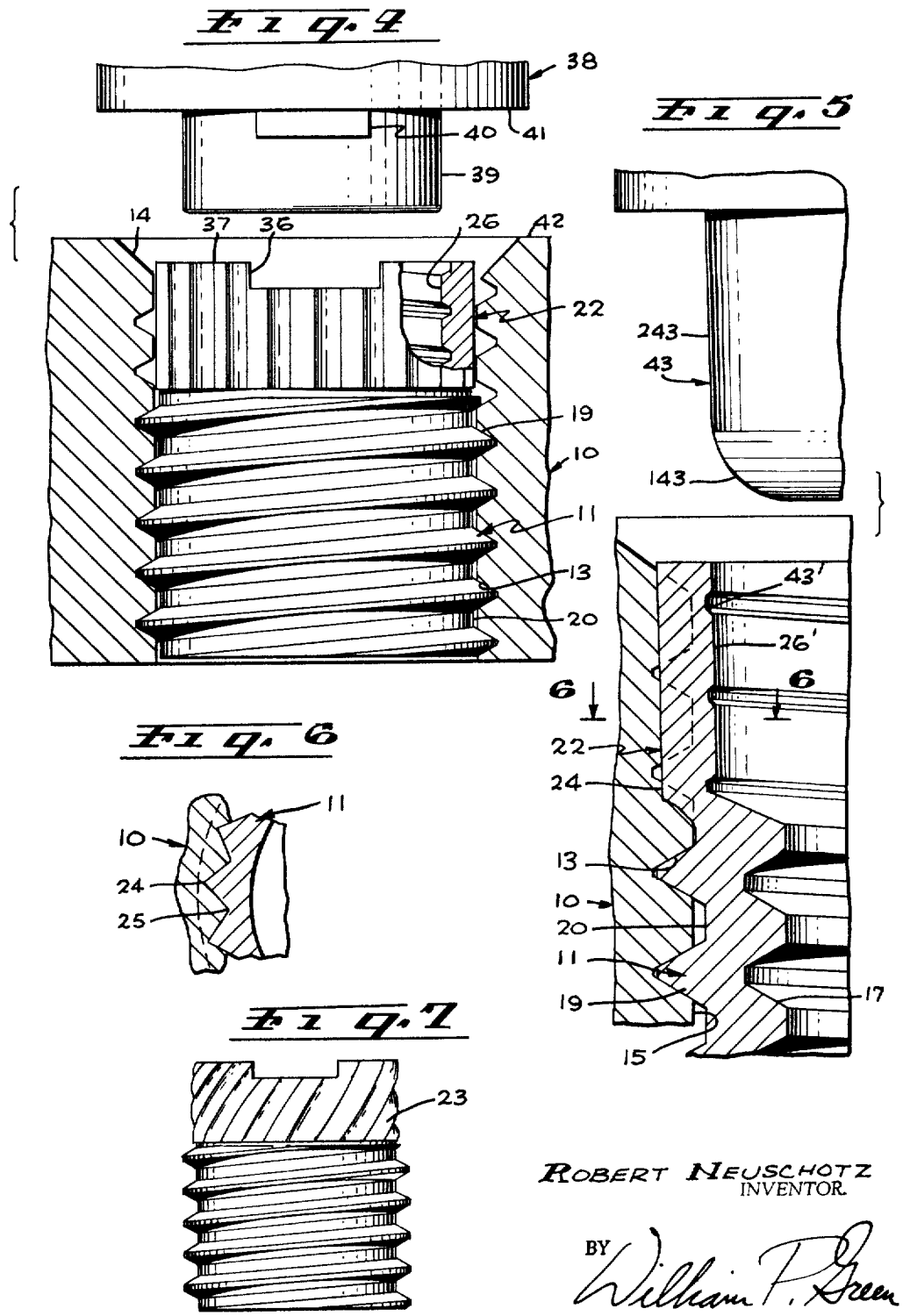

United States Patent Office 3,279,053
Patented Oct. 18, 1966

3,279,053
METHOD OF INSTALLING THREADED ELEMENT
Robert Neuschotz, 1162 Angelo Drive,
Beverly Hills, Calif.
Filed Nov. 26, 1963, Ser. No. 326,092
7 Claims. (Cl. 29—523)

This invention relates to an improved method for installing a threaded element, desirably an internally and externally threaded insert, within a bore or recess in a carrier part. Certain features relating to the structure of the insert itself are covered in my copending application Serial Number 402,379, entitled "Threaded Insert Having Expandable Serrated Locking Portion," filed October 8, 1964, now Patent No. 3,220,454, which application was a continuation in part of my co-pending application Serial No. 326,074, entitled "Thin Walled Threaded Elements," filed November 26, 1963, now abandoned. The invention will be described primarily as applied to the installation of thin walled threaded inserts, but as will be apparent, the methods of the invention are also applicable to inserts having thicker walls, or other threaded elements having expandable locking portions and other structural characteristics enabling their installation within a carrier part by the methods defined in the claims.

There have in the past been attempts to devise very thin walled threaded inserts, having external threads to be screwed into a carrier part, and containing internal threads which are very near in size to the external threads in order to minimize the thickness of the wall of the insert. A major reason for attempting to develop such thin walled inserts has been to reduce the overall weight of the inserts, a factor of considerable importance in aircraft, as well as to enable the use of inserts in situations where there is insufficient space for reception of a conventional thick walled insert. However, all prior thin walled inserts with which I am acquainted have had certain very definite disadvantages in production and in use, and as a result these devices have not attained as wide a use as would be desired.

One disadvantage of prior thin walled inserts has resided in the criticality with which it has been necessary to form the recess or hole into which the insert is to be screwed, in order to attain an effective locking of the insert in the hole. More particularly, these prior inserts have required that the receiving hole have a first threaded portion, and outwardly thereof have a counterbore whose depth and diameter must be dimensioned very accurately to properly receive and coact with a locking portion of the insert. The requirement for such a counterbore has considerably increased the cost of installing a thin walled insert, and has rendered inserts of this type impractical for many uses for which they might otherwise be adapted.

A major object of the present invention is to provide an improved method for installing a threaded element in a carrier part, which method is adapted for application to thin walled inserts, and will greatly reduce the complexity and cost of installing thin walled inserts, particularly of the type disclosed in my above identified copending application. As will appear, the present method enables the installation of a thin walled insert within a passage or bore which is threaded along its entire length, by a simple conventional threading operation, and without the necessity for the provision of any special counterbore or other complicating configuration for reception of the locking portion of the insert. Instead, the locking portion is received within the interior of a portion of the threaded bore itself, and coacts with the threads of that bore to attain the desired locking action. Further, the locking action is actually increased by reason of a unique locking relationship which is attained with the threads, to thereby maximize the torque which the ultimate lock will withstand before allowing the insert to be forceably unscrewed.

The insert utilized with the present invention is provided with a serrated portion which is so dimensioned as to be received primarily, and preferably substantially entirely, within the confines of a diameter corresponding to the minor diameter of the carrier part threads into which the insert is to be screwed. In accordance with the invention, the insert is screwed into the receiving passage until the serrated locking portion is received within part of the receiving thread, radially opposite and inwardly of that thread. The locking portion is then expanded radially outwardly to force the serrations against the threads of the carrier part, and into the material of those threads to positions effectively locking the device against unscrewing movement. The serrations have peaks which are preferably elongated in a direction having a substantial axial component, so that the peaks actually cross the threads in a manner forming a generally transverse blocking structure at the location of each serration.

The above and other features and objects of the invention will be better understood from the following detailed description of the typical embodiments illustrated in the accompanying drawings in which:

FIG. 1 is a side view, partially broken away, of an insert of the type with which the present invention is concerned, showing the insert prior to installation within a carrier part;

FIG. 2 is a transverse section taken on line 2—2 of FIG. 1;

FIG. 3 is a fragmentary greatly enlarged axial section through a portion of the FIG. 1 insert;

FIG. 4 shows the insert after being screwed into the carrier part, but before expansion of its locking portion;

FIG. 5 is an enlarged fragmentary axial section through the insert after expansion to locking condition;

FIG. 6 is a section on line 6—6 of FIG. 5; and

FIG. 7 shows a variational form of the invention.

Referring first to FIG. 1, I have shown at 10 a carrier part into which an insert 11 is to be screwed. The carrier part has a passage 12 containing internal threads 13 which may be of uniform diameter along their entire length. A short tapering countersink 14 may be provided at the axially outer end of the threaded bore. As seen best in FIG. 3, the threads 13 may be of conventional 60 degree configuration (i.e. defining a 60 degree included angle between opposite side surfaces of a thread), but with somewhat modified minor diameter axially extending surfaces 15.

Insert 11 has a generally tubular body 16, typically formed of steel or other metal, and containing internal threads 17 for threadedly receiving a mating screw represented at 18. Externally, insert body 16 has threads 19 configured to mate with and screw into the internal threads 13 formed in carrier part 10. Internal threads 17 of the insert are of a size very close to the size of external threads 19, so that the resulting thickness of the side wall of the insert, between the major diameter of the internal threads and the minor diameter of the external threads, is very small. More particularly, the external threads are in most instances a single size larger than the internal threads (referring of course to standard thread sizes), or in the smaller inserts two standard sizes apart. In order to maximize the thickness of the insert wall, for any two selected internal and external thread sizes, the external threads 19 have modified minor diameter surfaces 20, which are spaced radially outwardly farther than would be the normal minor diameters of standard threads otherwise having the same configuration as threads 19. As will be apparent, modified minor diameter surfaces 20 are preferably substantially exactly cylindrical in shape, and extend directly parallel to the main axis 21 of the insert.

At its axially outer end (upper end in FIG. 1), insert 11 has a locking portion 22 which is adapted to be expanded radially outwardly against some of the carrier part threads to form a lock therewith. This portion 22 is tubular and circularly continuous, and is externally knurled, to form a series of axially extending circularly spaced serrations or knurls 23. As best seen in FIG. 2, each of these serrations may taper radially outwardly to an outer peak 24, with reduced thickness and reduced external diameter valleys 25 formed circularly between these serrations or peaks. The various serrations may all be identical, and may be uniform in cross section along their entire axial length. Thus, the peaks 24 form axially extending essentially sharp edges capable of biting into the internal threads of the carrier part in locking relation.

Internally, locking portion 22 of the insert contains a counterbore 26 which may be cylindrically disposed about axis 21 of the insert, and which preferably is at a diameter 27 which is substantially greater than the minor diameter 28 of internal threads 17. Preferably, the diameter 27 of the counterbore is less than the major diameter 29 of internal threads 17, with the threads 17 being continued upwardly through counterbore 26, but being truncated thereby as will be apparent from FIG. 3. For best results, it is found desirable that the radial height of the internal threads which are truncated by counterbore surface 26 be between about one-half and one-fifth of the radial height of the rest of the internal threads which are not truncated by the counterbore.

In order to enable the insert to be screwed into threaded bore 13, serrations 23 are formed to be located primarily within, and preferably substantially entirely within, the diameter 30 of minor diameter surfaces 15 of carrier part threads 13. This relationship is brought out best in FIG. 3, which indicates that for optimum results the peak or maximum diameter portions 24 of the serrations are substantially equal to or very slightly smaller than minor diameter 30 of the carrier part threads, to be close fits within those threads. To allow this, the diameter 31 of serration peaks 24 must be substantially smaller than the major diameter 32 of carrier part threads 13, and substantially smaller than major diameter 33 of external threads 19 of the insert. In addition, it is preferred that the diameter 31 of serration peaks 24 be greater than the modified minor diameter 34 of external threads 19 of the insert. With regard to the valley portions 25 of the serrations, the diameter 35 of these valley portions should be substantially less than the minor diameter 34 of the external threads of the insert, and substantially greater than the major diameter 29 of the internal threads of the insert, and of course greater than the diameter of counter bore 26.

For initially screwing the insert into the carrier part, locking portion 22 has one or more driving notches 36 (typically two diametrically opposite notches), which may have the rectangular shape shown in FIG. 1, which notches extend axially inwardly from and beyond a transverse annular planar end surface 37 of the insert.

To now describe the method of installation of the insert of FIGS. 1 through 6, the first step in such installation is to screw the insert into carrier part 10 from the position of FIG. 1 to the position of FIG. 4. This is desirably attained by means of a drive tool such as that shown at 38 in FIG. 4, having a pilot 39 receivable within the threaded bore of the insert, and having two teeth 40 positioned to be received within drive notches 36 of the insert in a relation turning the insert into the carrier part recess. When the insert reaches the fully installed position of FIG. 4, engagement of annular surface 41 of the tool 38 with outer surface 42 of the carrier part prevents further advancement of the tool, so that the insert then advances only far enough to move out of engagement with driving teeth 40, and thus reach the position of FIG. 4 in which the outer surface of the insert is located slightly inwardly of the outer surface of the carrier part.

After the insert has reached the FIG. 4 position, locking portion 22 of the insert is expanded outwardly from the position of FIG. 3 to the position of FIG. 5, by means of an essentially cylindrical expanding tool such as that shown at 43 in FIG. 5. This expanding tool has a lower rounded annular portion 143, and an essentially cylindrical portion 243 thereabove (desirable very slightly tapered or frusto-conical as shown). The tool is forced downwardly into counterbore 26, and by reason of the annular rounded lower end 143 of the tool acts to flare or annularly expand locking portion 22 outwardly to the position of FIG. 5 in which portion 22 is still circular but at an increased diameter corresponding to that of portion 243 of the tool, so that serrations 23 bite into the radially opposed turns of carrier part threads 13, to attain a very effective self locking action preventing unscrewing rotation of the insert from the carrier part. The fact that the serrations extend axially causes them to cut transversely across the length of the individual turns of threads 13 (whose length of course extends circularly about axis 21), so that the resulting crossed or transverse relationship between the serrations and the engaged threads maximizes the locking effectiveness of the portion 22. Since the portion of the carrier part into which the serrations are expanded is threaded, rather than being a straight cylindrical counterbore as in some prior devices, the expansion may be attained with a minimum expanding force, while the portions of the carrier part threads which are deformed by expansion of the serrations may be forced into the thread grooves of the carrier part to further lock the serrations and insert against rotation. Additionally, expansion of the locking serrations into threads of the carrier part, rather than into a straight counterbore, reduces the tendency to create outward stresses in the carrier part, by allowing the metal of the carrier part threads to cold-flow into the spaces between threads.

It is noted that counterbore surfaces 26 within the insert should be expanded radially outwardly at least as far as the major diameter 29 of the internal threads of the insert, and preferably considerably outwardly beyond that diameter, as to the position represented at 26' in FIG. 5. Such expansion will normally result in a reduction in depth of the small thread grooves 43 to the condition shown at 43' in FIG. 3, but these distorted grooves and threads within the interior of the locking portion are expanded to a great enough diameter that they normally will not contact or interfere in any way with engagement of screw 18 with the internal threads 17.

The truncated or partial threads formed by counterbore 26 assist in strengthening the essentially annular upper locking portion of the insert, so that in spite of the very thin walled structure of the insert, and in spite of the fact that the serrations are received within the minor diameter of the carrier part threads, the wall of locking portion 22 still has sufficient strength to resist rupture or tearing by the expanding forces encountered upon actuation to locking condition. Therefore, after expansion, the locking portion 22 is still circularly continuous, even at the minimum thickness locations of valleys 25 between the serrations, with sufficient strength at these reduced thickness locations to coact with the other portions of locking structure 22 in maintaining the peaks in the expanded locking position of FIG. 5.

FIG. 6 shows another form of insert which is the same as that of FIG. 1, except that the serrations 23 extend somewhat diagonally or helically, rather than directly axially.

As an example of a particular insert structure falling within the scope of the present invention, the following dimensions are found highly effective in an insert having 10–32 internal threads and modified ¼–28 external threads:

| | Inches |
|---|---|
| Minor diameter 28 of internal threads | .160 |
| Counterbore diameter 27 | .178 |
| Major diameter 29 of internal threads | .193 |
| Minimum diameter 35 of serrations | .201 |
| Modified minor diameter of external threads | .214 |
| Peak diameter 31 of serrations (and minor diameter 30 of carrier part thread) | .221 |
| Major diameter 33 of external thread | .250 |
| Major diameter 32 of carrier part thread | .253 |

In actual manufacture of an insert having the above specified nominal dimensions, tolerances must of course be allowed, and the dimensions may therefore vary a few thousandths from those given. It is found that cumulative tolerances may result in the maximum diameter 31 of serrations 23 being very slightly greater (a few thousandths greater) than the minor diameter 30 of the carrier part threads, without precluding effective use of the insert. Desirably, in the particular structure referred to, the peak diameter 31 of the serrations has a tolerance from .221 inch to .223 inch, while diameter 30 is formed with a .221 drill, having a tolerance from .220 to .225. Consequently, a .003 interference fit is possible, in which case the serration peaks will merely ream out the minor diameter of the carrier part threads very slightly as the serrations are advanced into those threads with slightly increased installation torque. In spite of this possibility for a slight interference fit, such an arrangement is considered, within the terminology of the present application, as having the serrations received substantially entirely within the minor diameter of the carrier part threads.

Preferably, the minimum diameter 35 of the serrations is approximately midway between peak diameter 31 and counterbore diameter 27. Also, it is found desirable that valley diameter 35 be substantially farther from the modified minor diameter 34 of the external threads than is peak diameter 31, preferably about twice as far.

If the ¼–28 external threads of the specific insert discussed above were completely standard, in accordance with the American Standard thread series, the minor diameter 34 of these threads would be .206 inch. However, this dimension is actually .214 inch, thus showing that the external thread does have a modified minor diameter as stated. It is further noted that preferably the valley diameter 35 of the serrations is less than not only the modified minor diameter, but also the standard minor diameter which the external threads would have if unmodified.

I claim:

1. The method of installing in a bore in a carrier part having internal threads an element having external threads and having a locking portion forming a series of circularly spaced teeth, said teeth being received primarily within a diameter corresponding to the minor diameter of said carrier part threads; said method including screwing said external threads into said carrier part threads to a position in which said teeth of said locking portion are received within said carrier part threads, primarily inside the minor diameter thereof to avoid excessive interference therewith, and with said teeth having radially outer peak portions received radially opposite the minor diameter portions of said carrier part threads, and then expanding said teeth radially outwardly against said minor diameter portions of the carrier part threads and into the material thereof to lock said element against unscrewing movement.

2. The method of installing in a bore in a carrier part having internal threads an element having external threads and having a locking portion forming a series of circularly spaced teeth, said teeth being received substantially entirely within a diameter corresponding to the minor diameter of said carrier part threads; said method including screwing said external threads into said carrier part threads to a position in which said teeth of said locking portion are received within said carrier part threads, substantially entirely inside the minor diameter thereof to avoid interference therewith, and with said teeth having radially outer peak portions received radially inwardly of and opposite the minor diameter portions of said carrier part threads, and then expanding said teeth radially outwardly against said minor diameter portions of the carrier part threads and into the material thereof to lock said element against unscrewing movement.

3. The method of installing in a bore in a carrier part having internal threads an element having external threads and having an unthreaded locking portion carrying radially outwardly projecting serrations with maximum diameter peak portions elongated in a direction having a substantial axial component, said serrations being received primarily within a diameter corresponding to the minor diameter of said carrier part threads; said method including screwing said external threads into said carrier part threads to a position in which said serrations of said unthreaded portion are received within said carrier part threads, primarily inside the minor diameter thereof, and with said peak portions of the serrations being received radially inwardly of and opposite and crossing the minor diameter portions of said carrier part threads, and then expanding said serrations radially outwardly against said minor diameter portions of said carrier part threads and into the material thereof in a relation disposed across the length of said threads to lock said element against unscrewing movement.

4. The method of installing in a bore in a carrier part having internal threads an element having external threads and having a circularly continuous externally unthreaded tubular locking portion axially outwardly of said external threads carrying radially outwardly projecting serrations with maximum diameter peak portions, said serrations being received primarily within a diameter corresponding to the minor diameter of said carrier part threads; said method including screwing said external threads into said carrier part threads, continuing advancement of said element to a position in which said serrations of said unthreaded portion are received within said carrier part threads, primarily inside the minor diameter thereof, and with said peak portions of the serrations received radially opposite the minor diameter portions of said carrier part threads, and then expanding said tubular portion and thereby expanding said serrations radially outwardly against said minor diameter portions of said carrier part threads and into the material thereof to lock said element against unscrewing movement, while maintaining said tubular portion circularly continuous even after expansion to hold the peaks in expanded condition.

5. The method of installing in a bore in a carrier part having internal threads an element having external threads and having a locking portion carrying radially outwardly projecting serrations with maximum diameter peak portions and circularly intermediate valley portions of reduced external diameter integrally connecting together successive peaks, said serrations being received primarily within a diameter corresponding to the minor diameter of said carrier part threads; said method including screwing said external threads into said carrier part threads, to a position in which said serrations of said locking portion are received within said carrier part threads, primarily inside the minor diameter thereof, with said peak portions of the serrations being received radially opposite the minor diameter portions of the carrier part threads, and then expanding said serrations radially outwardly against said minor diameter portions of said carrier part threads and into the material thereof to lock said element against unscrewing movement, with said valley portions remaining intact as integral connections between successive peaks to hold them in expanded positions.

6. The method of installing in a bore in a carrier part having internal threads an element having external threads and having a circularly continuous tubular locking portion carrying radially outwardly projecting serrations with maximum diameter peak portions and circularly intermediate valley portions of reduced external diameter integrally connecting together successive peaks, said serrations being received substantially entirely within a diameter corresponding to the minor diameter of said carrier part threads; said method including screwing said external threads into said carrier part threads, to a position in which said serrations of said locking portion are received within said carrier part threads, substantially entirely inside the minor diameter thereof, with said peak portions of the serrations being received radially opposite the minor diameter portions of the carrier part threads, and then expanding said serrations radially outwardly against said minor diameter portions of said carrier part threads and into the material thereof to lock said element against unscrewing movement, with said valley portions remaining intact as integral connections between successive pekas to hold them in expanded positions.

7. The method of installing in a bore in a carrier part having internal threads an element having external threads and having a circularly continuous tubular locking portion carrying radially outwardly projecting and radially outwardly tapering serrations with maximum diameter peak portions elongated generally axially and circularly intermediate valley portions of reduced external diameter integrally connecting together successive peaks, said serrations being received substantially entirely within a diameter corresponding to the minor diameter of said carrier part threads; said method including screwing said external threads into said carrier part threads to a position in which said serrations of said locking portion are received within said carrier part threads, substantially entirely inside the minor diameter thereof, with said peak portions of the serrations being received radially opposite and crossing the minor diameter portions of the carrier part threads, and then expanding said serrations radially outwardly against said minor diameter portions of said carrier part threads and into the material thereof in crossing relation thereto to lock said element against unscrewing movement, with said valley portions remaining intact as integral connections between successive peaks to hold them in expanded positions.

References Cited by the Examiner
UNITED STATES PATENTS 2,577,810    12/1951    Rosan.
3,081,808    3/1963    Rosan et al. _____ 151—41.73

CHARLIE T. MOON, *Primary Examiner.*